United States Patent
Limbacher et al.

(10) Patent No.: US 10,166,984 B2
(45) Date of Patent: Jan. 1, 2019

(54) METHOD FOR DRIVER INFORMATION AND MOTOR VEHICLE

(71) Applicant: AUDI AG, Ingolstadt (DE)

(72) Inventors: Reimund Limbacher, Ingolstadt (DE); Heinrich Nägler, Ingolstadt (DE)

(73) Assignee: Audi AG, Ingolstadt (DE)

( * ) Notice: Subject to any disclaimer, the term of this patent is extended or adjusted under 35 U.S.C. 154(b) by 0 days.

(21) Appl. No.: 15/514,463

(22) PCT Filed: Jul. 18, 2015

(86) PCT No.: PCT/EP2015/001482
§ 371 (c)(1),
(2) Date: Mar. 24, 2017

(87) PCT Pub. No.: WO2016/045760
PCT Pub. Date: Mar. 31, 2016

(65) Prior Publication Data
US 2017/0274899 A1    Sep. 28, 2017

(30) Foreign Application Priority Data

Sep. 25, 2014    (DE) .......................... 10 2014 014 241

(51) Int. Cl.
*B60W 50/14* (2012.01)
*B60W 30/14* (2006.01)
(Continued)

(52) U.S. Cl.
CPC .......... *B60W 30/143* (2013.01); *B60W 30/09* (2013.01); *B60W 30/095* (2013.01);
(Continued)

(58) Field of Classification Search
USPC ....................................................... 701/64
See application file for complete search history.

(56) References Cited

U.S. PATENT DOCUMENTS

| | | | |
|---|---|---|---|
| 8,063,755 B2 * | 11/2011 | Eikelenberg | B60W 50/14 340/439 |
| 8,849,507 B2 | 9/2014 | Popp et al. | |

(Continued)

FOREIGN PATENT DOCUMENTS

| | | |
|---|---|---|
| CN | 102198832 A | 9/2011 |
| CN | 102729822 A | 10/2012 |

(Continued)

OTHER PUBLICATIONS

International Search Report and Written Opinion of the International Search Authority directed to related International Patent Application No. PCT/EP2015/001482 including English translation, dated Dec. 22, 2015; 18 pages.

(Continued)

*Primary Examiner* — Dirk Wright
(74) *Attorney, Agent, or Firm* — Sterne, Kessler, Goldstein & Fox, PLLC

(57) ABSTRACT

A method to provide driver information in a motor vehicle includes determining a route section predicted to be driven in the future by the motor vehicle and determining a reference speed as a function of at least one specified maximum speed through a speed limit in the predicted route section or in a partial section of the predicted route section. The method further includes determining a current actual driving speed of the motor vehicle, and providing a target acceleration notification to notify a driver of the motor vehicle of a potential acceleration of the motor vehicle if the reference speed is greater than the current actual driving speed at least by a specified differential value.

18 Claims, 2 Drawing Sheets

(51) Int. Cl.
*B60W 50/00* (2006.01)
*B60W 30/09* (2012.01)
*B60W 30/095* (2012.01)

(52) U.S. Cl.
CPC .... *B60W 30/0953* (2013.01); *B60W 50/0097* (2013.01); *B60W 50/14* (2013.01); *B60W 2050/146* (2013.01); *B60W 2520/10* (2013.01); *B60W 2550/10* (2013.01); *B60W 2550/22* (2013.01); *B60W 2550/402* (2013.01); *B60W 2550/408* (2013.01); *B60W 2710/0638* (2013.01); *B60W 2710/1005* (2013.01); *B60W 2720/106* (2013.01)

(56) References Cited

U.S. PATENT DOCUMENTS

| | | |
|---|---|---|
| 2003/0060961 A1 | 3/2003 | Ishizu et al. |
| 2007/0158125 A1 | 7/2007 | Braeuchle et al. |
| 2013/0211652 A1 | 8/2013 | Shibata |
| 2015/0197247 A1* | 7/2015 | Ichinokawa ........ B60W 30/143 701/93 |

FOREIGN PATENT DOCUMENTS

| | | | |
|---|---|---|---|
| DE | 103 36 333 A1 | 3/2005 | |
| DE | 10 2005 050 540 A1 | 5/2007 | |
| DE | 10 2005 055 322 A1 | 5/2007 | |
| DE | 10 2010 028 087 A1 | 10/2011 | |
| DE | 10 2010 029 467 A1 | 12/2011 | |
| DE | 10 2010 041 539 A1 | 3/2012 | |
| DE | 102010041539 A1 * | 3/2012 | ........... B60K 26/021 |
| EP | 2 769 866 A2 | 8/2014 | |
| EP | 2769866 A2 * | 8/2014 | ........... B60K 26/021 |
| EP | 2769866 A3 * | 4/2018 | |
| WO | WO2006/037360 A1 | 4/2006 | |
| WO | 2010/144026 A1 | 12/2010 | |

OTHER PUBLICATIONS

International Preliminary Report on Patentability directed to related International Patent Application No. PCT/EP2015/001482 including English translation, dated Mar. 28, 2017; 14 pages.

* cited by examiner

METHOD FOR DRIVER INFORMATION AND MOTOR VEHICLE

TECHNICAL FIELD

The invention relates to a method for providing driver information in a motor vehicle.

BACKGROUND

The use of notification functions that use predictive route data in motor vehicles in order to provide the driver with information on a route section expected to be driven in the future is known. In particular, assistant systems are known that provide a driver with information on predictive route data in order to increase consumption efficiency. For example, a symbol in an interface can be displayed in order to instruct the driver to take the foot off the gas when, according to the predictive route data in the further course of the route, a deceleration of the motor vehicle is necessary. Through the use of predictive route data, corresponding notifications can be provided significantly earlier than a driver would let go of the gas and allow the motor vehicle to simply continue to roll according to the driver's own estimation. With such type of system, gains in efficiency can particularly be achieved when signs showing the speed limit are not recognized until relatively late due to the route course or obstacles. An increase in efficiency can be further improved when, in addition to the speed limits, information on the route course, particularly information on ascents and descents can also be evaluated.

For many vehicles, an optimization of consumption however is not always decisive. Frequently, especially time-efficient driving, in which a destination is especially quickly reached, is desired. For navigation systems, it is already known that, in addition to especially consumption-efficient routes, especially quick or chronologically short routes can also be calculated with a driving destination. It is desirable, however, to optimize other driving parameters of a motor vehicle with respect to great time efficiency, in addition to the route.

BRIEF DESCRIPTION OF THE DRAWINGS/FIGURES

DETAILED DESCRIPTION

Figure 1:
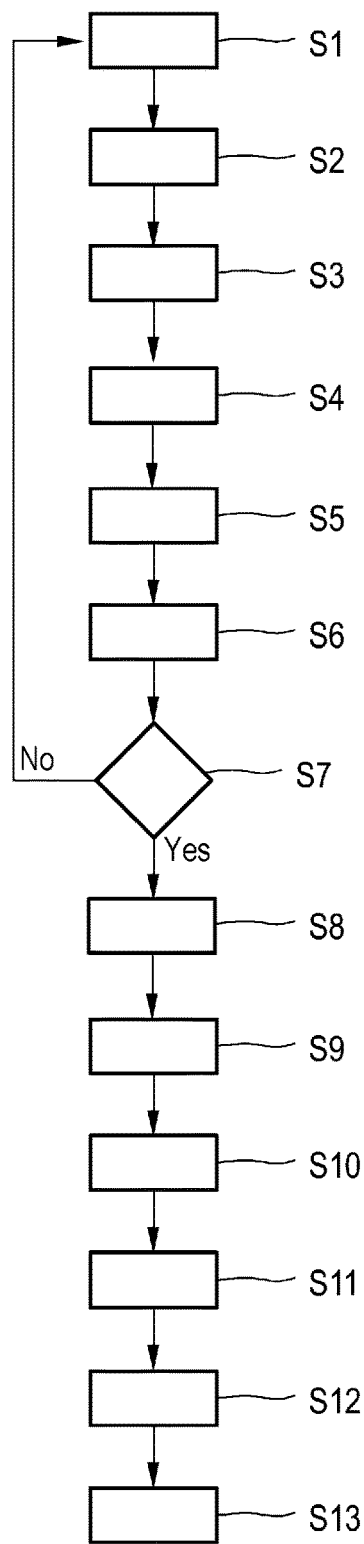
FIG. 1 illustrates a flowchart of a method, according to some embodiments.

Thus, the object of the invention is to provide a method for driver information that can increase the time efficiency of a driving operation of a motor vehicle.

The task is achieved according to the invention by a method of the aforementioned type comprising the following steps:

- determination of a route section predicted to be driven in the future by the motor vehicle,
- determination of a reference speed as a function of at least one specified maximum speed through a speed limit in the predicted route section or in a partial section of the predicted route section,
- determination of a current actual driving speed of the motor vehicle, and
- provision of target acceleration notification to notify the driver of the motor vehicle of a potential acceleration of the motor vehicle if the reference speed is greater than the current actual driving speed by at least a specified differential value.

According to the invention, it is proposed to evaluate information regarding a predicted route section expected to be driven by the motor vehicle in the future, i.e. predictive route data, and to provide notifications to the driver as a function of this data in order to increase a time efficiency of the driving operation. To this end, a speed limit specified in at least one partial section of the predicted route section is evaluated and a reference speed is determined as a function of said speed limit. In particular, a speed limit can be considered in the route section directly ahead. However, changes in a specified maximum speed can also be considered such that the reference speed, in ranges in which a braking action is required and/or an acceleration is possible, is adaptable. In order to instruct the driver in driving in the most time-efficient manner possible, the driver is given a notification as to when the actual driving speed is less than the reference speed by a specified amount. This can indicate to the driver that an additional acceleration action is possible. The driver can thus be instructed as to legally and safely drive as quickly as possible.

The determination of the reference speed can be adaptable, particularly by the driver. Thus, absolute or relative increases, for example, in the reference speed or in the maximum speed considered in the calculation of the reference speed, can be specifiable by a driver.

In order to determine the predicted route section, a navigation system of the motor vehicle can be used. In particular, a section of a planned route can be used as a predicted route section. Many navigation systems are formed to predict a future driving route of a motor vehicle when no destination is programmed or when the motor vehicle obviously deviates from a planned route. In this case, a section of the predicted route can be used as the predicted route section.

In particular, the reference speed can be determined as a function of a geometric course of the predicted route section and/or of at least one driving-dynamics-relevant property of a roadway property describing a roadway in the predicted route section. The geometric course of the predicted route section and/or the driving-dynamics-relevant property of a roadway can be found in the map data of the navigation system. In particular, curve radii, ascents, and descents, as well as a type of the current or future road to be driven, for example whether it is an interstate, highway, or city street, can be considered. A consideration of this information when determining the reference speed enables physical and/or driver-specific limits in the driving operation to be considered. For example, a driver can be provided a notification when driving in a curve as to when an acceleration within the scope of a safe driving operation is again advisable physically and/or with consideration of the requirements of the driver with respect to driving comfort and/or the driver's capabilities.

It is possible for at least one reference position to be determined at which the specified maximum speed in the predicted route section and/or in a route section previously driven by the motor vehicle changes, wherein the reference speed is determined additionally as a function of a distance between the motor vehicle and the reference position over time and/or space, said distance being based on a route section of the predicted and/or of the previously driven route section. Particularly the length of the predicted route section between a current actual position of the motor vehicle and the reference position is determined as the spatial distance. A route length can be determined from map data, particularly from map data of a navigation system. As an alternative or supplement to this, a temporal distance can be calculated in that, for example, the current actual speed of the motor vehicle is considered.

In particular, a reference position in the predicted route section, at which the specified maximum speed increases, can be determined as the reference position. Thus, notifications can be given to the driver, in particular, to enable the driver to accelerate as early and quickly as allowed when a specified maximum speed increases to a higher maximum speed. Depending on the specific traffic rules in a country, it may be allowed, for example, to increase the speed of the motor vehicle moderately even before the passing of a traffic sign indicating the speed limit, for example 50 m before said sign. With a corresponding configuration of the method according to the invention, notifications can be given to the driver so as to drive in a manner that is as time-efficient and quick as possible as well as legal and safe.

As an alternative or supplement to this, a reference position can be determined at which the specified maximum speed reduces as a reference position in the route section driven previously by the motor vehicle. Depending on the specific traffic rules in a country, it may be allowed, for example, to use a certain area after a traffic sign indicating a speed limit, for example 50 m after said sign, to decelerate to the new maximum speed. An evaluation of the distance to the reference position in this case enables a continuous adaptation of the reference speed as a function of the distance.

To determine the reference position, map data can be used that describes the speed limits for multiple route sections. In particular, the map data of a navigation system can be utilized. As an alternative or supplement to this, it is possible to record markings for speed limits, particularly signs, using sensors in the motor vehicle and to determine a maximum speed specified by the respective speed limit through image recognition. The position of the detected marking in this case, i.e. the sign, can be determined as a reference position. A plurality of methods are known for acquiring the position of objects recognized by sensors in a motor vehicle. A triangulation through images of multiple cameras, time-of-flight based methods, and the use of a laser scanner are examples of these. In the method according to the invention, any method can be used for sensor evaluation to determine positions of objects and to detect objects in order to determine markings stating speed limits and their respective position.

On one hand, a detection of speed limits from sensor data enables a validation of speed limits specified by map data. On the other hand, temporary changes in speed limits that are not necessarily recorded in map data can be recorded by sensors in the motor vehicle. When markings for speed limits from sensor data are recorded, it is additionally possible to execute the method according to the invention without using map data or a navigation system. In many driving situations, it is possible to determine a route section to be driven in the future, for example a section of an expressway up ahead, solely from sensor data in the motor vehicle.

In order to obtain information regarding the predicted route section, particularly regarding the respective speed limits or the allocated reference positions, communication information can also be used in addition or as an alternative that is provided by an infrastructure device, another motor vehicle, or a radio station.

A target acceleration can be calculated as a function of the current actual driving speed and the reference speed, wherein the target acceleration information describes the target acceleration. It is possible for the target acceleration notification to only be provided when the target acceleration exceeds a specified limit value. As a supplement, it would also be possible for the provision of the target acceleration notification to then only be executed when the spatial and/or temporal distance between the motor vehicle and the reference position falls below a specified limit value. The time point of the output, that is the limit value for the spatial and/or temporal distance, can particularly be adjustable by a driver.

A notification can be generated optically, acoustically, and/or, haptically. An optical representation of a target acceleration can take place, for example, through a traction circle, in which particularly the current longitudinal and transverse acceleration as well as the target acceleration are shown. As an alternative or supplement to this, a target acceleration setting can be shown, which corresponds to a target acceleration, and/or a target and an actual value for the acceleration can be shown. An optical representation can take place on an instrument cluster, a graphic display, for example, of a multimedia system, a head-up display, or by means of data glasses.

As a supplement to the notification output with respect to a target acceleration, a maximum speed, which applies starting from the reference position and/or the reference speed, can be displayed. As a supplement, the time obtained through use of the method according to the invention and/or driving times for a similar route or a similar route section from previous drives can be displayed to the driver for showing the success of the method.

A speed limit that stipulates a higher maximum speed is also understood to be a speed in the method according to the invention that enables any fast speeds, that means a speed limit overrides. A target acceleration is additionally understood to be an acceleration that increases the speed of the motor vehicle.

The steps of determining the target acceleration and the provision of the notification can be repeated multiple times such that the motor vehicle is accelerated to a target driving speed dependent on the maximum speed specified by the driver at the reference position, when the notifications are followed by the driver.

The target acceleration can be determined such that a driving speed is maximum at minimally one specified position in the predicted route section while considering at least one boundary condition related to a driving operation of the motor vehicle and/or a motor vehicle state. In particular, a boundary condition can be the consideration that the motor vehicle is not accelerated to a speed that is greater than the higher maximum speed that applies starting from the reference position. As an alternative or supplement to this, various maximum speeds can be specified for various positions in the predicted route section as the boundary condition, wherein the target acceleration is determined such that the driving speed at the corresponding position does not exceed the corresponding maximum speed. The specified position for which a driving speed is maximized can particularly be the reference position or a position specified along the predicted route section after the reference position.

As an alternative, it is possible for the target acceleration to be determined such that a distance of a point, at which the higher maximum speed is achieved upon an acceleration with the target acceleration, is minimal from the reference position while considering at least one boundary condition relating to a driving operation of the motor vehicle and/or a motor vehicle state. The at least one boundary condition corresponds to the previously explained boundary condition. It can thus be achieved that the higher maximum speed is achieved as early as possible after the reference position is passed.

As an alternative, the target acceleration can be determined such that a predicted driving time to a specified driving destination is minimal, under at least one specified boundary condition related to a driving operation of the motor vehicle and/or a motor vehicle state. The at least one boundary condition corresponds in turn to the previously described boundary condition. The driving destination can particularly be a driving destination input by a driver. However, it is also possible for a driving destination to be determined automatically, for example by an automatic route guidance function of a navigation system.

Particularly a fill level of a fuel tank and/or a charge state of an energy store can be considered the boundary condition or one of the boundary conditions. The time efficiency of a driving operation can be increased when the tank or charge intervals are avoided during the drive to a driving destination. Within the scope of determining the target acceleration, it can be determined whether additional tank or charge intervals are necessary when using certain target accelerations. In particular, various scenarios, which describe different target accelerations, can be calculated for the drive to the destination, wherein stops for the motor vehicle for fueling or for charging can be considered in calculating the drive time to a specified driving destination. For example, a high target acceleration can be specified with a full tank or a full battery. If the destination is reached according to a projection with a low tank volume or battery charge however, fuel efficiency can be maximized in order to avoid additional stops. As an alternative or supplement to this, it is possible to determine the reference speed as a function of the fill level or the charge state.

Particularly in hybrid vehicles, energy stores can also be provided that enable a short-term increase in the driving performance. Higher accelerations can be achieved for certain time intervals as a function of the fill state of the energy store. It is thus advantageous as well to consider the charge state of said energy store as a boundary condition and/or when determining the reference speed.

In the method according to the invention, notifications that are as intuitive as possible with respect to the target acceleration should be provided to the driver of the motor vehicle. Thus, it is possible for a target accelerator pedal position to be determined from the target acceleration, according to which information related to the target accelerator pedal position is generated as a notification. If a notification regarding the target accelerator position is generated, the driver must exclusively place the accelerator pedal in the specified target accelerator pedal position in order to follow the notification. Thus, the notification is particularly intuitively understandable.

A notification regarding a target accelerator pedal position can particularly be generated as a haptic notification. Thus, an accelerator pedal can be used with a definable position of its pressure point, wherein, as a notification, the target accelerator pedal position is specified as the position of the pressure point. It is especially possible to correspondingly move the pressure point of the accelerator pedal by using a control element or a menu system in the motor vehicle, which can be activated or deactivated separately from the output of the notification.

As a function of the specific driving task and driver type, an especially consumption-efficient or especially time-efficient drive can be desired depending on the situation. In many situations, a mixture of a time-efficient and consumption-efficient drive can be desired as well. It is thus possible for a control input to be recorded for adapting the type of determination of the target acceleration, according to which there is an adaptation as to the extent an energy consumption of the motor vehicle is considered during the determination of the target acceleration. As an alternative or supplement to this, there can also be an adjustment by means of the control input and/or a further control input as to the extent to which an energy consumption is considered in determining the reference speed. This can take place in many cases, for example, through different weighting of the parameters considered. In particular, a control element can be used to toggle continuously or in stages, in two or more stages, between an especially time-efficient and especially consumption-efficient drive.

In order to further increase the time efficiency of the driving operation and to enable an improved acceleration outcome, further vehicle systems can be actuated, in addition to the notification output, or further notifications can be generated to the driver. Thus, a gear, to be selected depending on the reference speed and the current actual driving speed of the motor vehicle, of a transmission of a motor vehicle, can be determined, according to which a target gear notification related to the gear to be selected is sent to the driver or an automatic transmission is actuated to select the gear to be driven. By means of an adaptation of the gear used, an optimum rotational speed range can be specified for the acceleration. In particular, a notification can be given to the driver to gear down or the transmission can be actuated to gear down. For example, a shift light can be shown on a display device of the motor vehicle that prompts the driver to gear down one or more gears.

As a supplement or alternative to this, a boost pressure of a turbocharger, particularly of an electrically operated turbocharger, can be adapted as a function of the reference speed and the current actual driving speed of the motor vehicle. Other vehicle parameters, for example transmission target torques and/or chassis parameters, can also be adapted as a function of the aforementioned variables.

It is possible that, in recording a further vehicle driving in front of the motor vehicle, an overtaking notification related to the overtaking of the other vehicle can be generated as a function of the occupation of other lanes of a driven roadway and/or of a geometric course of the predicted route section. The recording of another vehicle driving ahead is possible due to environmental sensors in the motor vehicle. The issuing of the overtaking notification may additionally depend, for example, on the actual driving speed and/or the reference speed and/or the target acceleration.

In addition to the method, the invention also relates to a motor vehicle that is designed to execute the method according to the invention.

Figure 2:
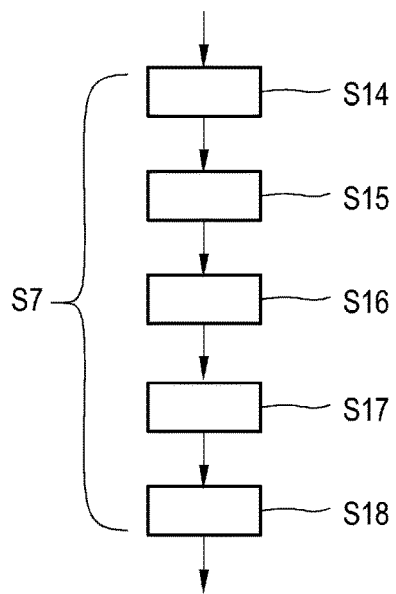
FIGS. 2 and 3 illustrate flowcharts for various embodiments of the steps for determining the target acceleration in the method according to FIG. 1.
Figure 3:
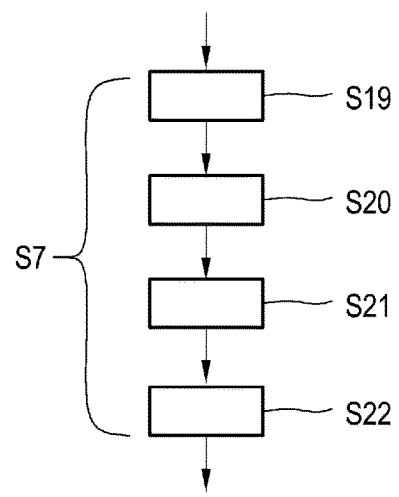
Figure 4:
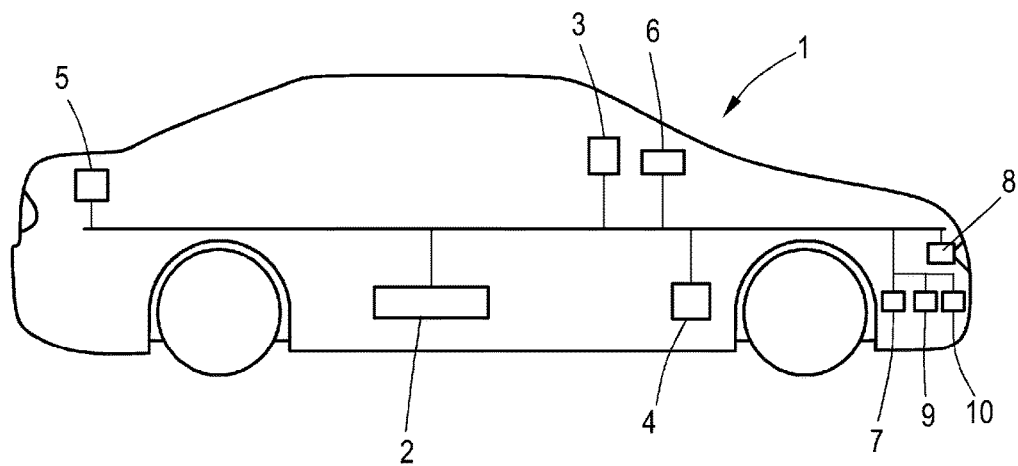
FIG. 4 illustrates a motor vehicle according to the invention.

The following exemplary embodiments and the associated drawings show additional advantages and details of the invention. The following is shown schematically:

FIG. 1 shows a flowchart of an exemplary embodiment of a method according to the invention;

FIGS. 2 and 3 show flowcharts for various embodiments of the steps for determining the target acceleration in the method according to FIG. 1; and FIG. 4 shows a motor vehicle according to the invention.

FIG. 1 schematically shows a flowchart of a method for providing driver information in a motor vehicle, in which a driver is provided notifications for a time-efficient driving method. In step S1, first an actual vehicle position is determined by a position determination device of a motor vehicle, for example by a satellite navigation system.

In step S2, subsequently a predicted route section, expected to be driven in the future by the motor vehicle, is determined. The determination of the predicted route section takes place by means of a navigation system in the motor vehicle. Through the navigation system, a route to a destination input by the driver is calculated, and as long as the motor vehicle is moving on the predicted route, the section of this route ahead is determined as the predicted route section. Alternatively, it is possible for the navigation system to be used in order to predict a route section to be driven in the future by the motor vehicle if no destination is specified by the driver or if the actual driving route deviates from the planned route. Various methods for this are known in the prior art. They will not be explained in detail.

Subsequently, specified maximum speeds are evaluated through a speed limit or multiple speed limits in the predicted route section in step S3. The speed limits for a plurality of route sections are stored in the map data of the navigation system. Correspondingly, speed limits can be extracted from the map of the navigation system. In an alternative exemplary embodiment of the method, sensor information from environmental sensors in the motor vehicle can also be evaluated as a supplement or alternative in order to record markings, particularly signs, in a sensor recording area and recognize speed limits specified by these markings.

In step S4, a reference position is determined at which the maximum speed specified by the speed limit increases to a higher maximum speed. Because map data was already used in steps S3 in order to determine the presence of an increase in the maximum speed, a reference position can be read from the map data in step S4. In the aforementioned alternative exemplary embodiment in which speed limits are determined by motor vehicle sensors, a sensor-based position determination is necessary in this step. Numerous methods for sensor-based position determination, for example the use of time-of-flight cameras, laser scanners, or a triangulation through multiple camera images, are known from the prior art that can be used individually or combined to determine the reference position.

In step S5, a spatial distance between the motor vehicle and the reference position can be calculated along the predicted route section. As an alternative or supplement to this, a temporal distance can be calculated in that the spatial distance is divided by a current or a predicted speed of the motor vehicle. The determination of a spatial and/or temporal distance is used, on one hand, to determine whether a notification should be generated to the driver and, on the other hand, to determine a reference speed for the motor vehicle.

In step S6, a reference speed is determined for the motor vehicle. The reference speed is a speed for the motor vehicle that is maximally legal, safe, and especially comfortable to drive in the current driving situation. A first speed is calculated, as a function of properties of the route driven in the predicted route course, especially of curve radii, which can be comfortably and safely driven in the section of the route course directly ahead and especially when considering driver properties. In doing so, particularly accelerations that occur are evaluated. As a function of a currently valid speed limit, a speed limit changed at the reference position, and the distance to the reference position, a maximum legal second speed is additionally calculated. In calculating the second speed, an absolute or relative offset specified by the driver can be considered. In a further embodiment of the method, reductions in the maximum speed through a speed limit in the just driven route section can also be considered in calculating the second speed. The lower between the first and second speed is determined as a reference speed.

In step S7, a check is done to determine whether a differential value between the referenced speed determined in step S6 and the current actual speed is greater than a particular limit specified by the driver, i.e. whether the reference speed shows that the speed of the motor vehicle can be increased. For example, if the current actual driving speed is relatively high or the spatial or temporal distance between the motor vehicle and the reference position is relatively large, it is possible that a further increase in the vehicle speed may not be allowed or not desirable. In this case, there should be no notification generated to the driver for further acceleration of the motor vehicle, which is why the method is repeated starting from step S1. As a supplement to this, it is possible at high actual driving speeds to also provide notifications regarding speed reduction.

In step S8, a target acceleration is determined for the motor vehicle. The determination of the target acceleration takes place as a function of the reference speed and the current actual driving speed of the motor vehicle, which is recorded by sensors on the motor vehicle. In particular, the speed limit specified at the reference position and/or the distance to the reference position is likewise considered. Possibilities for determining the target acceleration are explained later in detail with reference to FIG. 2 and FIG. 3.

A driver should be instructed to drive the motor vehicle according to the target acceleration, to the extent possible, in order to achieve a time-efficient drive. In order to support the driver in driving with the target acceleration, multiple notification and control functions of the motor vehicle are used in steps S9 to S13.

In step S9, in the event that environmental sensors in the motor vehicle recognize that the motor vehicle is behind another motor vehicle, there is an evaluation to determine whether overtaking of said vehicle is safely possible and advisable in order to achieve the target acceleration. To this end, a distance to the vehicle ahead, a relative speed, the acceleration of the other vehicle, the occupation of a neighboring or opposing lane, and the road course are evaluated. In particular, the target acceleration is considered as the actual acceleration of the motor vehicle in predicting a potential overtake maneuver. In the method according to the invention, a target acceleration can be considered to achieve a higher reference speed even when evaluating the overtake options and thus in providing the overtake notification.

Because it is known that the motor vehicle should accelerate, it is possible to adapt various vehicle systems to a future acceleration. Thus, a gear of the transmission of the motor vehicle to be selected is determined as a function of the current actual vehicle speed of the motor vehicle and the reference speed, and an automatic transmission is actuated for selecting the gear to be driven, in step S10. The gear to be selected is selected particularly such that a maximum acceleration or at least the target acceleration can be achieved by the motor vehicle. In particular, a lower gear is selected. Thus, step S10 corresponds to an anticipated kickdown; this means there is no waiting until the driver actually requests a high acceleration by pressing on the gas pedal, but rather shifting down takes place as soon as an expected high acceleration request. In alternative embodiments of the method for use in motor vehicles without automatic transmissions, it is also possible to display a shift notification to the driver, for example in the form of a shift light in order to instruct the driver to shift gears.

In step S11, a target boost pressure is determined as a function of the actual driving speed in the reference speed for a turbocharger, and the boost pressure of the turbocharger is increased to the target boost pressure. In particular, the target boost pressure is determined as a function of the target acceleration. Similarly as indicated in step S10, a future performance request is predicted by the driver, and the vehicle prepares for this.

In step S12, a target acceleration pedal setting is determined, as a function of the target acceleration, in which the target acceleration is expectedly achieved as a function of further determined motor vehicle and/or environmental parameters. As a function of said target accelerator pedal position, a controllable pressure point of an accelerator pedal of the motor vehicle is adapted. A pressure point in this case is a point at which an actuating pressure is modified to adjust the accelerator pedal. A movable pressure point can be provided, for example, through an additional adjustable damping element or spring element. According to the determined target accelerator pedal position, an actuator is actuated that moves the additional pressure point of the accelerator pedal. Thus, an especially intuitively understandable notification is issued for the driver that the driver should place the accelerator pedal in the target accelerator pedal position.

In step S13, an optical notification is additionally issued to the driver that shows the target acceleration. The display takes place on a multifunction display as a traction circle, which shows the current longitudinal and transverse acceleration and the longitudinal and transverse acceleration upon an acceleration according to the target acceleration. In alternative exemplary embodiments, a display could also be in a head-up display, an instrument cluster display arranged behind the steering wheel, or data glasses. The type of display may also vary. For example, a target accelerator pedal position could be shown graphically, and bars, pointers, or the like could be used in order to show an actual acceleration and/or a target acceleration.

FIG. 2 shows an option for calculating the target acceleration in step S8. In step S14, first a user-side adjustment is read from a data store of the motor vehicle to the extent that an energy consumption of the motor vehicle should be considered during determination of the target acceleration. A corresponding user input takes place particularly by means of a menu-based input system in which the driver can toggle, particularly continuously or in multiple stages, between an especially energy-efficient and an especially time-efficient drive.

In step S15, an acceleration position is determined that describes a position of the predicted route section from which the motor vehicle should be accelerated in order to achieve the higher maximum speed. As a function of the respective legislature in a country, it may be possible to accelerate to a value between the previously specified maximum speed and the higher maximum speed even before the reference position of the motor vehicle. Corresponding rules may additionally depend on a road type or the like. In particular, a combination of map data of a navigation system and a reference database can be used in order to determine the position, with respect to a reference position, from which an acceleration to speeds beyond the maximum speed specified before the reference position should occur. At the same time, in step S15 there is a determination regarding what position or positions of the predicted route section at which a speed should be maximized.

In step S16, multiple acceleration profiles of the actual position of the motor vehicle with respect to the reference position or a position after the reference position are determined, and at least one speed is determined for at least one position for the respective acceleration profile. If it is determined in step S15 that an acceleration is possible before the reference position, the reference position is thus selected as the position or one of the positions. On the other hand, if an acceleration is not possible until starting at the reference position, a position is determined beyond the reference position as a function of the higher maximum speed and the roadway type at which the speed is evaluated. The speed profiles are determined such that the higher maximum speed or a speed derived from the higher maximum speed is not exceeded. In addition, only target accelerations are considered that are actually achievable by the motor vehicle.

In step S17, a predicted consumption is calculated for each of the acceleration profiles determined in step S16. In addition to the acceleration, properties of the predicted route section, particularly ascents and descents, are considered here.

In step S18, a weighted total from the speed and consumption achieved is calculated for each of the acceleration profiles. The consumption in this case is evaluated negatively. The weighting factors are determined as a function of the user setting read in step S14 with respect to a weighting between consumption efficiency and time efficiency. That acceleration profile for which the weighted total is maximum is selected as the acceleration profile from which the target acceleration is determined.

In alternative exemplary embodiments, it is possible to consider speeds at multiple positions. These can be incorporated separately into the weighted total. Alternatively, it is additionally possible to determine the acceleration profile for determining the target acceleration by varying the acceleration profile in order to maximize the weighted total.

The determination of the target acceleration described in FIG. 2 maximizes a local time efficiency, which means the motor vehicle should be moved as quickly as possible to a relatively close point. It is frequently desirable however to optimize a global time efficiency for an entire drive of the motor vehicle; this means to minimize a total time that is required for a drive to a specified destination. In particular when the fill level of a tank or the charge state of a battery that is used for driving operation is low, it may be possible that an increase in the consumption means that additional fueling or charging stops are necessary due to strong accelerations. In this case, it may be possible for a selection of a lower target acceleration to lead to a reduced driving time overall.

A determination of a target acceleration that considers this is shown in FIG. 3. In step S19, first a fill level of a tank or a charge state of a battery is determined through sensors on the motor vehicle. In step S20, multiple acceleration scenarios are determined for the motor vehicle as in step S16. Subsequently in step S21, a time until a driving destination is reached is determined for each of these acceleration scenarios. The driving destination can be programmed by a driver in a navigation system or determined by the navigation system independently. Within the scope of the calculation of the driving time, a consumption profile of the motor vehicle is also calculated, and fueling or charging stops are planned for the motor vehicle at gas stations or charging stations stored in the navigation system. The predicted time considers the additional times that are required for fueling or charging the motor vehicle.

In step S22, subsequently the acceleration scenario is selected, the time of which is the least for reaching the destination, and a target acceleration corresponding to the acceleration scenario is provided for the following steps.

In an alternative embodiment, only individual parameters, for example a maximum achieved rotational speed of the motor vehicle or a maximum boost pressure of a turbocharger, can be varied in the individual acceleration scenarios, which have especially strong influence on the consumption of the motor vehicle. In a further alternative embodiment, additional boundary conditions can be considered. For example, in a hybrid vehicle, it can be considered that the destination is achieved through purely electric driving as an additional boundary condition.

FIG. 4 shows a motor vehicle that is designed to execute the method shown in FIG. 1. The motor vehicle 1 comprises a control device 2, which is used to provide a notification to the driver of the motor vehicle relating to a target acceleration. To this end, the display 3 for generating an optical notification can be activated, and an actuator 4 allocated to an accelerator pedal can be actuated in order to move a pressure point of the accelerator pedal by shifting an additional spring element. The determination of the target acceleration takes place as explained in FIGS. 1 to 3. To this end, the control device 2 records an actual position of the motor vehicle by evaluating the data of a satellite navigation device 5, for example of a GPS receiver. By using the actual position and map data as well as destination specification of a navigation system 6, a predicted route section is determined. In addition, an actual driving speed of the motor vehicle is determined by the speed sensor 7. As previously explained, the control device 2 determines a target acceleration from this data and controls the display 3 and the actuator 4 accordingly.

As a supplement, the control device 2 evaluates images of a camera 8 in order to determine whether there is a vehicle in front of the motor vehicle and in order to recognize markings or signs, as a supplement to the map data of the navigation system 6, which specify speed limits.

In addition, the control device 2 controls an automatic transmission 9, as a function of a determined target acceleration, in order to select a target gear that optimally corresponds to the target acceleration. In addition, it controls an engine control 10 in order to adapt to the boost pressure of a turbocharger.

The invention claimed is:

1. A method to provide driver information in a motor vehicle, the method comprising:
    determining a route section predicted to be driven at a future time by the motor vehicle;
    determining a reference speed as a function of at least one specified maximum speed through a speed limit in the predicted route section or in a partial section of the predicted route section;
    determining a current actual driving speed of the motor vehicle; and
    providing a target acceleration notification to notify a driver of the motor vehicle of a potential acceleration of the motor vehicle if the reference speed is greater than the current actual driving speed at least by a specified differential value.

2. The method according to claim 1,
further comprising:
using a navigation system of the motor vehicle to determine the predicted route section.

3. The method according to either claim 1,
wherein determining the reference speed comprises:
determining the reference speed as a function of a geometric course of the predicted route section and/or of at least one driving-dynamics-relevant property of a roadway property describing a roadway in the predicted route section.

4. The method according to claim 1, further comprising:
determining at least one reference position at which the at least one specified maximum speed in the predicted route section and/or in a route section previously driven by the motor vehicle changes, wherein the reference speed is determined additionally as a function of a distance between the motor vehicle and the at least one reference position over time and/or space, the distance being based on a route section of the predicted route section and/or of a previously driven route section.

5. The method according to claim 4,
wherein the determining at least one reference position comprises:
determining a position in the predicted route section, at which the at least one specified maximum speed increases, as the at least one reference position.

6. The method according to claim 4,
wherein the determining at least one reference position comprises:
using map data that describes speed limits for multiple route sections to determine the at least one reference position.

7. The method according to claim 1, further comprising:
calculating a target acceleration as a function of the current actual driving speed and the reference speed, wherein the target acceleration notification describes the target acceleration.

8. The method according to claim 4, further comprising:
repeating the calculating the target acceleration and the provision of the target acceleration notification such that the motor vehicle is accelerated to a target driving speed dependent on the at least one specified maximum speed when the notifications are followed by the driver.

9. The method according to claim 7,
wherein
the target acceleration is determined such that a driving speed is maximum at minimally one specified position in the predicted route section while considering at least one boundary condition related to a driving operation of the motor vehicle and/or a motor vehicle state.

10. The method according to claim 7,
wherein
the target acceleration is determined such that a predicted driving time to a specified driving destination is minimal, under at least one specified boundary condition related to a driving operation of the motor vehicle and/or a motor vehicle state.

11. The method according to claim 9,
wherein the at least one specific boundary comprises a fill level of a fuel tank and/or a charge state of an energy store.

12. The method according to claim 7, further comprising:
determining a target accelerator pedal position based on the target acceleration, wherein information related to the target accelerator pedal position is generated as a notification.

13. The method according to claim 12, further comprising:
using an accelerator pedal with a definable position of a pressure point, wherein, as the target acceleration notification, the target accelerator pedal position is specified as the position of the pressure point.

14. The method according to claim 7, further comprising:
recording a control input for adapting the calculation of the target acceleration, wherein an energy consumption of the motor vehicle is considered during the calculation of the target acceleration.

15. The method according to claim 1, further comprising:
determining a gear of transmission of the motor vehicle depending on the reference speed and the current actual driving speed of the motor vehicle; and
sending a target gear notification based on the determined gear to the driver or actuating an automatic transmission to select the determined gear to be driven.

16. The method according to claim 1, further comprising:
adapting a boost pressure of a turbocharger as a function of the reference speed and the current actual driving speed of the motor vehicle.

17. The method according to claim 1, further comprising:
in response to a further vehicle driving in front of the motor vehicle, generating an overtaking notification related to an overtaking of the further vehicle as a function of recorded occupation of other lanes of a driven roadway and/or of a geometric course of the predicted route section.

18. A motor vehicle, comprising:
a control device configured to:
determine a route section predicted to be driven at a future time by the motor vehicle;
determine a reference speed as a function of at least one specified maximum speed through a speed limit in the predicted route section or in a partial section of the predicted route section;
determine a current actual driving speed of the motor vehicle; and
provide a target acceleration notification to notify a driver of the motor vehicle of a potential acceleration of the motor vehicle if the reference speed is greater than the current actual driving speed at least by a specified differential value.

* * * * *